(12) United States Patent
Senarath

(10) Patent No.: US 11,050,626 B2
(45) Date of Patent: Jun. 29, 2021

(54) SERVICE PROVISION FOR OFFERING NETWORK SLICES TO A CUSTOMER

(71) Applicant: Nimal Gamini Senarath, Ottawa (CA)

(72) Inventor: Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/958,237

(22) Filed: Apr. 20, 2018

(65) Prior Publication Data

US 2018/0316564 A1 Nov. 1, 2018

Related U.S. Application Data

(60) Provisional application No. 62/492,068, filed on Apr. 28, 2017.

(51) Int. Cl.
*H04L 12/24* (2006.01)
*H04L 12/911* (2013.01)
*H04L 29/06* (2006.01)

(52) U.S. Cl.
CPC .......... *H04L 41/0893* (2013.01); *H04L 41/12* (2013.01); *H04L 41/5003* (2013.01);
(Continued)

(58) Field of Classification Search
CPC . H04L 41/0893; H04L 41/12; H04L 41/5003; H04L 41/5006; H04L 41/5051;
(Continued)

(56) References Cited

U.S. PATENT DOCUMENTS 10,715,353 B2 * 7/2020 Kulkarni .............. G06F 11/263
2014/0086177 A1 3/2014 Adjakple et al.
(Continued)

FOREIGN PATENT DOCUMENTS

CN 106341832 A 1/2017
CN 107222318 A 9/2017
(Continued)

OTHER PUBLICATIONS

3GPP TR 28.801 v1.1.0 (Mar. 2017); 3rd Generation Partnership Project; Technical Specification Group Services and System Aspects;Telecommunication management; Study on management and orchestration of network slicing for next generation network (Release 14) (Year: 2017).*
(Continued)

*Primary Examiner* — Ninos Donabed

(57) ABSTRACT

A system for managing a network comprising at least one network slice instance including at least one network slice subnet instance. The system comprises a network slice management function associated with each network slice instance, the network slice management function configured to expose one or more management functions to a customer such that the customer can effect limited management of its associated network slice instance; and a network slice subnet management function associated with each network slice subnet instance, the network slice management function configured to expose one or more management functions to a customer such that the customer can effect limited management of its associated network slice subnet instance.

15 Claims, 9 Drawing Sheets

(52) U.S. Cl.
CPC ...... *H04L 41/5006* (2013.01); *H04L 41/5051* (2013.01); *H04L 47/70* (2013.01); *H04L 63/08* (2013.01); *H04L 63/20* (2013.01); *H04L 41/5077* (2013.01)

(58) Field of Classification Search
CPC ......... H04L 47/70; H04L 63/08; H04L 63/20; H04L 41/0806; H04L 41/0896; H04L 41/5009; H04L 41/5054; H04L 41/0803; H04L 41/5048; H04L 41/5087; H04L 41/5077; H04W 48/18; H04W 28/24; H04W 24/02; H04W 28/0268; H04W 16/10
See application file for complete search history.

(56) References Cited

U.S. PATENT DOCUMENTS

| | | | | |
|---|---|---|---|---|
| 2017/0006083 | A1* | 1/2017 | McDonnell | ......... H04L 67/1097 |
| 2017/0141973 | A1 | 5/2017 | Vrzic | |
| 2017/0303259 | A1 | 10/2017 | Lee et al. | |
| 2017/0371692 | A1* | 12/2017 | Connolly | ............. G06F 9/45558 |
| 2018/0004576 | A1* | 1/2018 | Gokurakuji | ............... G06F 9/46 |
| 2018/0018192 | A1* | 1/2018 | Gokurakuji | ............. H04L 41/20 |
| 2018/0018193 | A1* | 1/2018 | Yabushita | ................ G06F 11/20 |
| 2018/0077080 | A1* | 3/2018 | Gazier | ................ H04L 43/0817 |
| 2018/0123878 | A1* | 5/2018 | Li | ........................... H04L 47/70 |
| 2018/0331856 | A1* | 11/2018 | Kulkarni | ............. H04L 41/5035 |

FOREIGN PATENT DOCUMENTS

| | | | | |
|---|---|---|---|---|
| EP | 3247169 | A1 | 11/2017 | |
| WO | 2017063708 | A1 | 4/2017 | |
| WO | 2017067599 | A1 | 4/2017 | |
| WO | WO-2017113109 | A1 * | 7/2017 | ............ H04W 76/11 |
| WO | WO-2018200733 | A1 * | 11/2018 | ............ H04W 24/02 |

OTHER PUBLICATIONS

3GPP TS 28.531 V0.2.0 (Dec. 2017);3rd Generation Partnership Project;Technical Specification Group Services and System Aspects;Telecommunication Management;Provisioning of network slicing for 5G networks and services (Release 15);total 13 pages.

3GPP TR 28.801 V15.0.0 (Sep. 2017),3rd Generation Partnership Project;Technical Specification Group Services and System Aspects;Telecommunication management;Study on management and orchestration of network slicing for next generation network(Release 15),total 78 pages.

3GPP TR 28.801 V1.1.0, 3rd Generation Partnership Project;Technical Specification Group Services and System Aspects;Telecommunication management;Study on management and orchestration of network slicing for next generation network (Release 14), Mar. 31, 2017.

S5-171666 Huawei,"pCR TR 28 801 solution for providing a network slice to a customer",3GPP TSG SA WG5 (Telecom Management) Meeting #112, Mar. 27-31, 2017.

S5-171665 Huawei,"pCR TR 28.801 generic e2e customer service provision solution",3GPP TSG SA WG5 (Telecom Management) Meeting #112, Mar. 27-31, 2017.

S5-171671 Huawei,"Add potential solution for NSI related service performance measurement",3GPP TSG SA WG5 (Telecom Management) Meeting #112, Mar. 27-31, 2017.

3GPP TR 28.800 V15.0.0 (Jan. 2018), Study on management and orchestration architecture of next generation networks and services (Release 15).

3GPP TR 28.801 V15.1.0 (Jan. 2018), Study on management and orchestration of network slicing for next generation network (Release 15).

3GPP TS 28.530 V15.0.0 (Sep. 2018), Management and orchestration; Concepts, use cases and requirements (Release 15).

Huawei,"Add potential solution of limited level of management exposure for network slicing",3GPP TSG SA WGS (Telecom Management) Meeting #112 S5-171682,Mar. 27-31, 2017, Guilin (China),total 4 pages.

* cited by examiner

SERVICE PROVISION FOR OFFERING NETWORK SLICES TO A CUSTOMER

CROSS-REFERENCE TO RELATED APPLICATIONS

This application is based on, and claims benefit of, U.S. Provisional Patent Application No. 62/492,068 filed Apr. 28, 2017, the entire content of which is incorporated herein by reference.

FIELD OF THE INVENTION

The present invention pertains to the field of Communications networks, and in particular to service provision for offering network slices to a customer.

BACKGROUND

Network function virtualization (NFV) is a network architecture concept that uses the technologies of IT virtualization to create entire classes of virtualized network functions into building blocks that may be connected to each other or to other entities, or may be chained together, to create communication services. NFV relies upon, but differs from, traditional server-virtualization techniques, such as those used in enterprise IT. A virtualized network function (VNF) may consist of one or more virtual machines (VMs) running different software and processes, on top of standard high-volume servers, switches and storage devices, or even cloud computing infrastructure, instead of having custom hardware appliances for each network function. In other embodiments, a VNF may be provided without use of a Virtual Machine through the use of other virtualization techniques including the use of containers. In further embodiments, a customized hardware appliance may be resident within the physical infrastructure used for different virtual networks, and may be presented to each virtual network as a virtual version of itself based on a partitioning of the resources of the appliance between networks. For example, a virtual session border controller could be instantiated upon existing resources to protect a network domain without the typical cost and complexity of obtaining and installing physical network protection units. Other examples of VNFs include virtualized load balancers, firewalls, intrusion detection devices and WAN accelerators.

The NFV framework consists of three main components:
Virtualized network functions (VNFs) are software implementations of network functions that can be deployed on a network functions virtualization infrastructure (NFVI).
Network functions virtualization infrastructure (NFVI) is the totality of all hardware and software components that provide the resources upon which VNFs are deployed. The NFV infrastructure can span several locations. The network providing connectivity between these locations is considered as part of the NFV infrastructure.
Network functions virtualization MANagement and Orchestration (MANO) architectural framework (NFV-MANO Architectural Framework, for example the NFV-MANO defined by the European Telecommunications Standards Institute (ETSI), referred to as ETSI_MANO or ETSI NFV-MANO) is the collection of all functional blocks, data repositories used by these blocks, and reference points and interfaces through which these functional blocks exchange information for the purpose of managing and orchestrating NFVI and VNFs.

The building block for both the NFVI and the NFV-MANO are the resources of an NFV platform. These resources may consist of virtual and physical processing and storage resources, virtualization software and may also include connectivity resources such as communication links between the data centers or nodes providing the physical processing and storage resources. In its NFV-MANO role the NFV platform consists of VNF and NFVI managers and virtualization software operating on a hardware platform. The NFV platform can be used to implement carrier-grade features used to manage and monitor the platform components, recover from failures and provide appropriate security—all required for the public carrier network.

Software-Defined Topology (SDT) is a networking technique that defines a logical network topology in a virtual network. Based on requirements of the service provided on the virtual network, and the underlying resources available, virtual functions and the logical links connecting the functions can be defined by an SDT controller, and this topology can then by instantiated for a given network service instance. For example, for a cloud based database service, an SDT may comprise logical links between a client and one or more instances of a database service. As the name implies, an SDT will typically be generated by an SDT controller which may itself be a virtualized entity in a different network or network slice. Logical topology determination is done by the SDT controller which generates a Network Service Infrastructure (NSI) descriptor (NSLD) as the output. It may use an existing template of an NSI and add parameter values to it to create the NSLD, or it may create a new template and define the composition of the NSI.

Software Defined Protocol (SDP) is a logical End-to End (E2E) technique that may be used within a network service instance. SDP allows for the generation of a customized protocol stack (which may be created using a set of available functional building blocks) that can be provided to different nodes or functions within the network, or network slice. The definition of a slice specific protocol may result in different nodes or functions within a network slice having defined procedures to carry out upon receipt of a type of packet. As the name implies, an SDP will typically be generated by one or more SDP controllers which may be virtualized functions instantiated upon a server.

Software-Defined Resource Allocation (SDRA) refers to the process of allocation of network resources for logical connections in the logical topology associated with a given service instance or network slice. In an environment in which the physical resources of a network are used to support a plurality of network slices, an SDRA controller will allocate the processing, storage and connectivity resources of the network to the different network slices to best accommodate the agreed upon service requirements for each of the network slices. This may result in a fixed allocation of resources, or it may result in an allocation that is dynamically changed to accommodate the different temporal distribution of traffic and processing requirements. As the name implies, an SDRA Controller will typically determine an allocation of resources, and may be implemented as a function that is instantiated upon a server.

Service Oriented Network Auto Creation (SONAC) is a technology that makes use of software-defined topology (SDT), software defined protocol (SDP), and software-defined resource allocation (SDRA) techniques to create a network or virtual network for a given network service instance. By coordinating the SDT, SDP, SDRA and in some embodiments Software Defined Network (SDN) control, optimization and further efficiencies can be obtained. In some cases, a SONAC controller may be used to create a network slice within which a 3rd Generation Partnership Project (3GPP) compliant network can be created using a virtualized infra-structure (e.g. VNFs and logical links) to provide a Virtual Network (VN) service. Those skilled in the art will appreciate that the resources allocated to the different VNFs and logical links may be controlled by the SDRA-type functionality of a SONAC controller, while the manner in which the VNFs are connected can be determined by the SDT-type functionality of the SONAC controller. The manner in which the VNFs process data packets may be defined by the SDP-type functionality of the SONAC controller. A SONAC controller may be used to optimize the Network Management, and so may also be considered to be a Network Management (NM) optimizer.

Network slicing refers to a technique for creating virtual networks which separate different types of network traffic, and which can be used in reconfigurable network architectures such as networks employing network function virtualization (NFV). A network slice (as defined in 3GPP TR 22.891 entitled "Study on New Services and Markets Technology Enablers," Release 14, Version 1.2.0, Jan. 20, 2016, is composed of a collection of logical network functions that supports communication service requirements of particular use cases. More broadly, a network slice may be defined as a collection of one or more core bearers (or PDU sessions) which are grouped together for some arbitrary purpose. This collection may be based on any suitable criteria such as, for example, business aspects (e.g. customers of a specific Mobile Virtual Network Operator (MVNO)), Quality of Service (QoS) requirements (e.g. latency, minimum data rate, prioritization etc.); traffic parameters (e.g. Mobile Broadband (MBB), Machine Type Communication (MTC) etc.), or use case (e.g. machine-to-machine communication; Internet of Things (IoT), etc.).

As the implementation details and standards of NFV evolve, systems and methods for service provision for offering network slices to a customer in a consistent and reliable manner are highly desirable.

Within this disclosure, abbreviations that are not specifically defined herein should be interpreted in accordance with 3rd Generation Partnership Project (3GPP) Technical Standards, such as, for example, Technical Standard TS 23.501 V0.3.1 (March 2017).

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide systems and methods of service provision for offering network slices to a customer.

Accordingly, an aspect of the present invention provides a system for managing a network comprising at least one network slice instance including at least one network slice subnet instance. The system comprises a network slice management function associated with each network slice instance, the network slice management function configured to expose one or more management functions to a customer such that the customer can effect limited management of its associated network slice instance; and a network slice subnet management function associated with each network slice subnet instance, the network slice management function configured to expose one or more management functions to a customer such that the customer can effect limited management of its associated network slice subnet instance.

BRIEF DESCRIPTION OF THE FIGURES

Further features and advantages of the present invention will become apparent from the following detailed description, taken in combination with the appended drawings, in which:

FIG. 7 is a flowchart illustrating an example process in accordance with a second embodiment;

It will be noted that throughout the appended drawings, like features are identified by like reference numerals.

DETAILED DESCRIPTION

Figure 1:
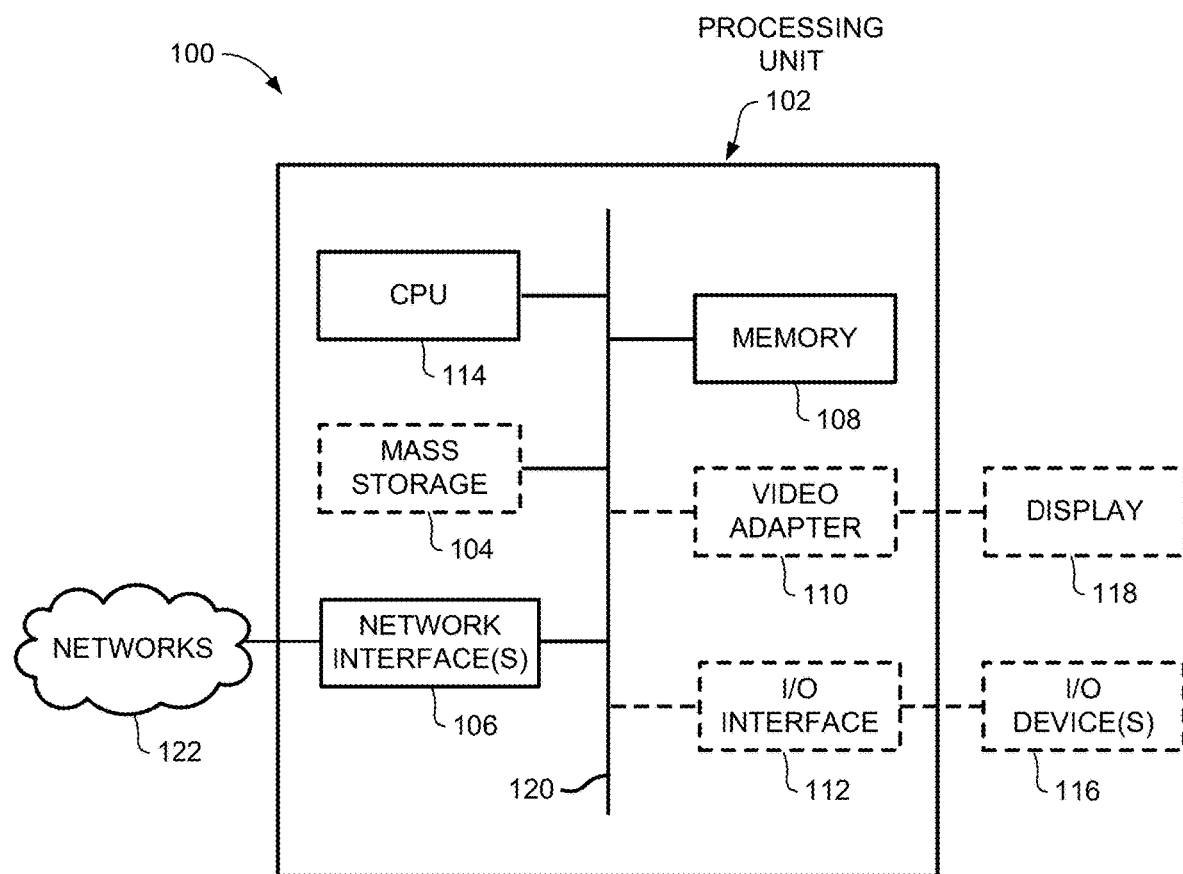
FIG. 1 is a block diagram of a computing system 100 that may be used for implementing devices and methods in accordance with representative embodiments of the present invention.

FIG. 1 is a block diagram of a computing system 100 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 100 includes a processing unit 102. The processing unit 102 typically includes a central processing unit (CPU) 114, a bus 120 and a memory 108, and may optionally also include a mass storage device 104, a video adapter 110, and an I/O interface 112 (shown in dashed lines).

The CPU 114 may comprise any type of electronic data processor. The memory 108 may comprise any type of non-transitory system memory such as static random access memory (SRAM), dynamic random access memory (DRAM), synchronous DRAM (SDRAM), read-only memory (ROM), or a combination thereof. In an embodiment, the memory 108 may include ROM for use at boot-up, and DRAM for program and data storage for use while executing programs. The bus 120 may be one or more of any type of several bus architectures including a memory bus or memory controller, a peripheral bus, or a video bus.

The mass storage 104 may comprise any type of non-transitory storage device configured to store data, programs, and other information and to make the data, programs, and other information accessible via the bus 120. The mass storage 104 may comprise, for example, one or more of a solid state drive, hard disk drive, a magnetic disk drive, or an optical disk drive.

The video adapter 110 and the I/O interface 112 provide optional interfaces to couple external input and output devices to the processing unit 102. Examples of input and output devices include a display 118 coupled to the video adapter 110 and an I/O device 116 such as a touch-screen coupled to the I/O interface 112. Other devices may be coupled to the processing unit 102, and additional or fewer interfaces may be utilized. For example, a serial interface such as Universal Serial Bus (USB) (not shown) may be used to provide an interface for an external device.

The processing unit 102 may also include one or more network interfaces 106, which may comprise wired links, such as an Ethernet cable, and/or wireless links to access one or more networks 122. The network interfaces 106 allow the processing unit 102 to communicate with remote entities via the networks 122. For example, the network interfaces 106 may provide wireless communication via one or more transmitters/transmit antennas and one or more receivers/receive antennas. In an embodiment, the processing unit 102 is coupled to a local-area network or a wide-area network for data processing and communications with remote devices, such as other processing units, the Internet, or remote storage facilities.

Figure 2:
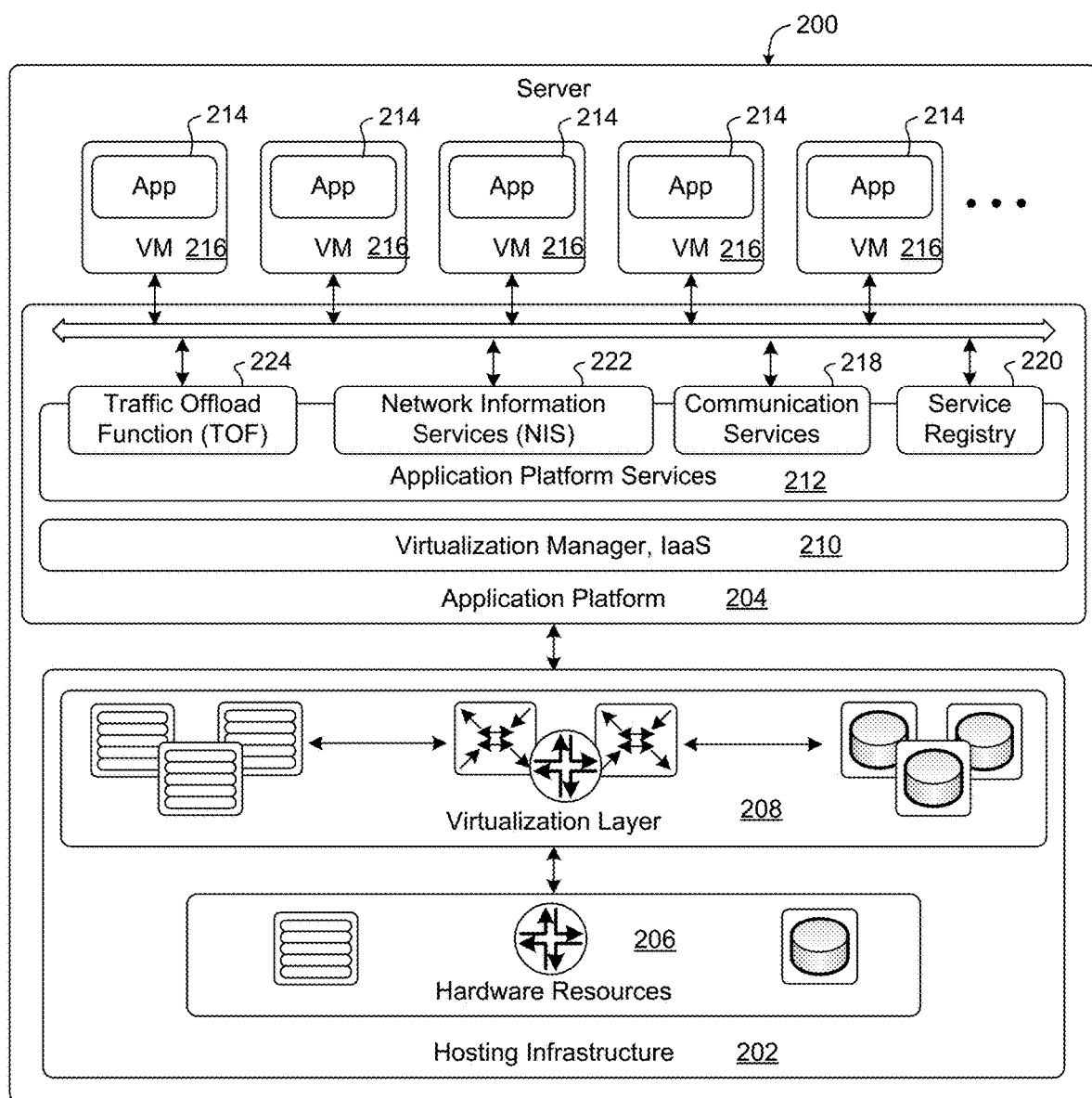
FIG. 2 is a block diagram schematically illustrating an architecture of a representative server usable in embodiments of the present invention.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP).

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities.

In operation, the virtualization manager 210 may provide a security and resource "sandbox" for each application being hosted by the platform 204. Each "sandbox" may be implemented as a Virtual Machine (VM) 216, or as a virtualized container, that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANO and SONAC (and its various functions such as SDT, SDP, and SDRA) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A Service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside mobile network elements, and also facilitates leveraging of the available real-time network and radio information. Network Information Services (NIS) 222 may provide applications 214 with low-level network information. For example, the information provided by MS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 224 in various ways, including: A Pass-through mode where (uplink and/or downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

Figure 3:
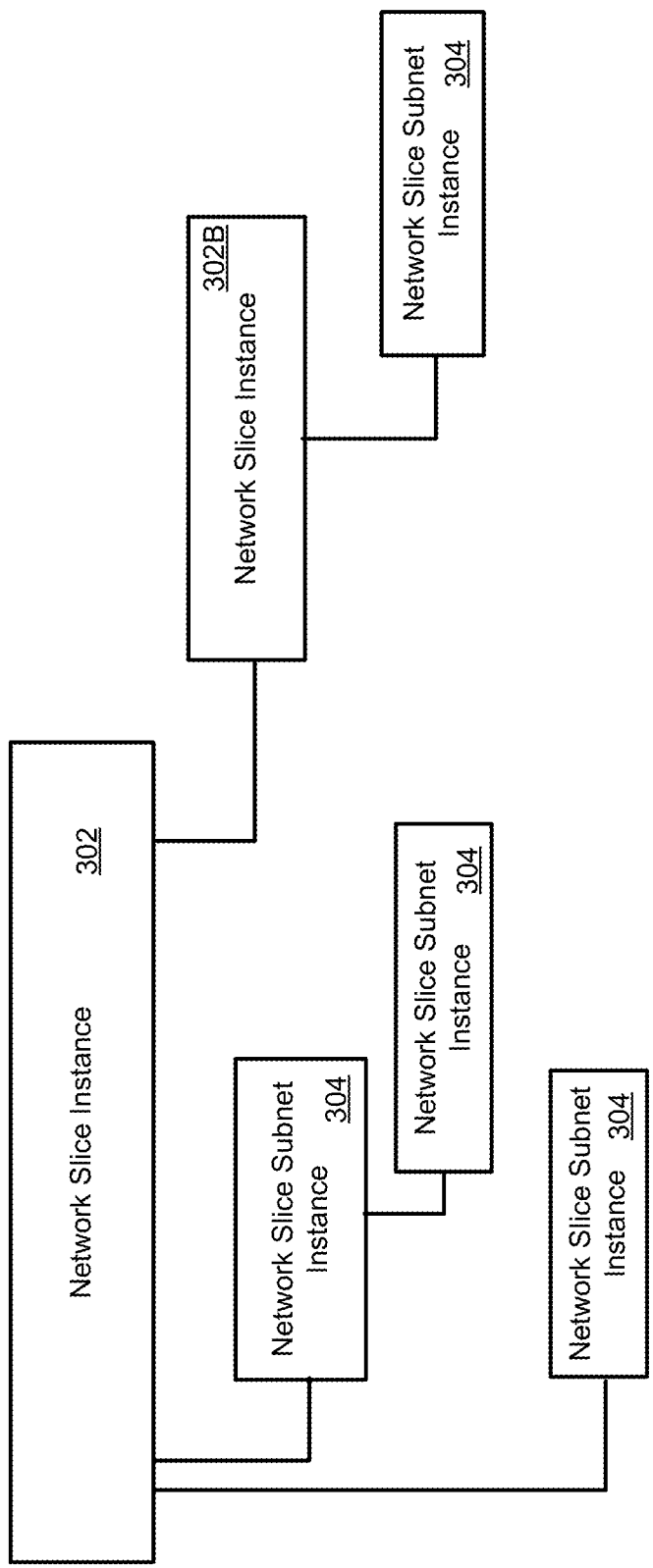
FIG. 3 is a block diagram illustrating an example model for the management of resources.

FIG. 3 illustrates a model for the management of resources. A 3GPP compliant Network Slice Instance (NSI) 302 is considered to have associated resources, and may incorporate a Network Slice Subnet Instance (NSSI) with it 304. An NSSI 304 may be a core network slice, or it may be a RAN slice. Through aggregating the resources of the various NSSIs within an NSI, it is possible to create an end-to-end network. Services requested from sub-domains may be provided as an NSSI.

By extending the 3GPP compliant model, an NSI 304 can incorporate another NSI 302B (which may be composed of at least one NSI). This may result in redundant resources, for example more than one core network slice. This can be accommodated using, for example, a geographic or device type profile. This would allow a first core network slice having associated RAN slices to serve a first geographic area, for example, while a second core network slice having a different set of RAN slices may serve a second geographic area.

In embodiments where RANs are shared between different core network slices, the selection of a core network slice may be a function of the service to which an electronic device such as a UE is subscribed, or it may be a function of the type of UE connecting (e.g. machine type communication devices may be assigned to the second core slice).

In 5G networks we need to provide various services to customers who have their own user population. There are three main categories of services a 5G network operator can provide. (1) e2E service; (2) network slice as a service (23) network sub-slice as a service. In this disclosure we provide procedures for the telecom management to handle such service from service request, admission to instantiation of the slices. When providing different services, different management functions need to be used for isolation and to better handle of the inter-operator and inter-domain service provision. Since we are dealing with customers who are having their own user pool, slicing for multiple customers in isolation is a task which needs new management procedures.

The following paragraphs discuss various management functions (CSMF, NSMF, NSSMF) involvement in different types of Persona (business entities) providing different types of services (e.g. service instance, NSI as a service, NSSI as a service).

The following subsections explains these classifications in detail.

Management Functions for E2E Communication Services Provided by a Sliced Network When a customer requires an e2e communication services, the network provider has to use an e2e network slice and ensure the e2e performance. In this case the network provider takes the role of a Communication Service Provider (CSP). CSMF will provide the NSMF with network slice requirements that corresponds to the service requirements. The service instance is the internal 3GPP representation of the service provided using the NSI. There can be multiple service instances served using the same NSI.

NOTE: Sharable NFs are identified by NSMF and NSSMF.

Figure 4:
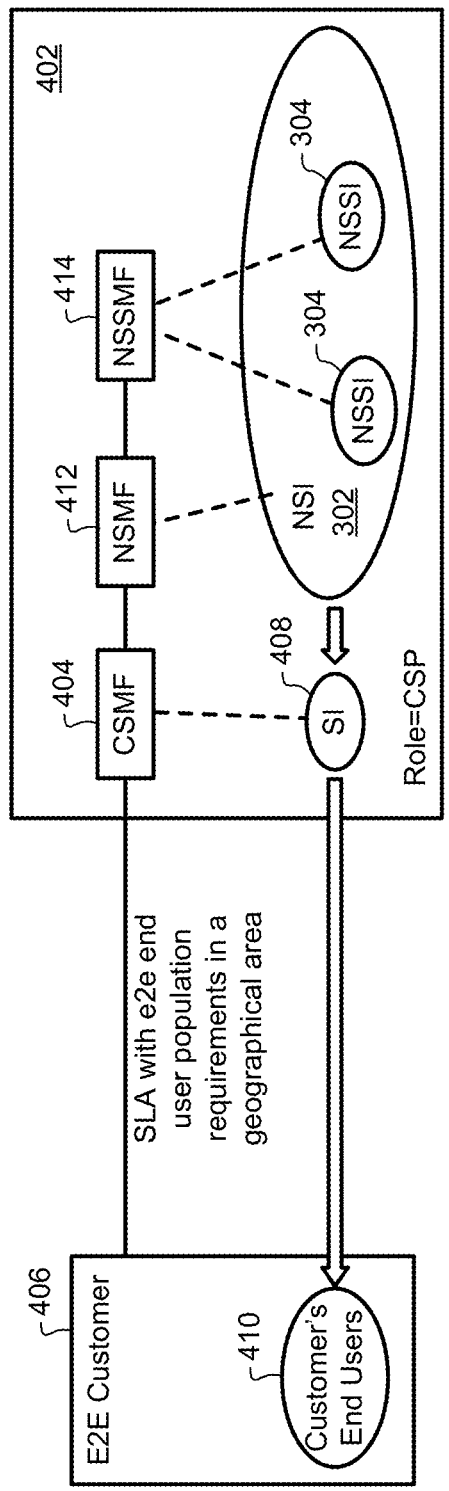
FIG. 4 is a block diagram illustrating an example of e2e communication services provided by a sliced network.

FIG. 4 shows an example of e2e communication services provided by a sliced network. In the embodiment of FIG. 4, the network slice management is fully hidden to customers (E2E customer) by the CSP in an E2E slicing service. Service request and related service negotiations and service related information including feedback and service request modification happens between the customer 406 and the CSMF 404. No other reference points.

In the example of FIG. 4, a Communication Service Provider (CSP) 402 (which may correspond with the network service provider) deploys a Communication Service Management Function (CSMF) 404 which is configured to interact with the e2e customer 406 to negotiate an SLA for a communications service instance (SI) 408 on behalf of an end-user population 410. In some embodiments, the CSMF 404 may use a service negotiation function (SNF) to negotiate the SLA. The SLA may include details regarding the customer's user population, such as service requirements and geographical distribution, for example. Based on the negotiated SLA, the CSMF 404 may interact with a Network Slice Management Function (NSMF) 412 to obtain network resources to support the SI 408. In order to provide the required resources, the NSMF 412 may implement (eg by creating or modifying) a network slice instance (NSI) 302. If required, the NSMF 412 may request network slice subnet resources to support the NSI 302. Based on the request received from the NSMF 412, a Network Slice Subnet Management Function 414 may implement (eg. by creating or modifying) one or more Network Slice Subnet Instances (NSSIs) 304 to provide the requested resources. Data related to the service instance (such as performance, traffic volume and charging, for example) may be provided to the customer by the CSP.

Management Functions Involved in Providing NSI as a Service

Embodiments of the present invention enable the provision of various types of NSI as a service. These types may include:

A Network slice with a specific logical network topology (such as, for example, NFs and links, and NSSIs);

A Network slice facilitating specific set of traffic flows, each with a given QoS, logical function chains and capability;

A Network slice consisting of a logical topology, pre-defined routes for different types of traffic considering source and destination, with a given capability limit; and A Network slice as a complete physical topology and resources with pre-defined routes.

Figure 5:
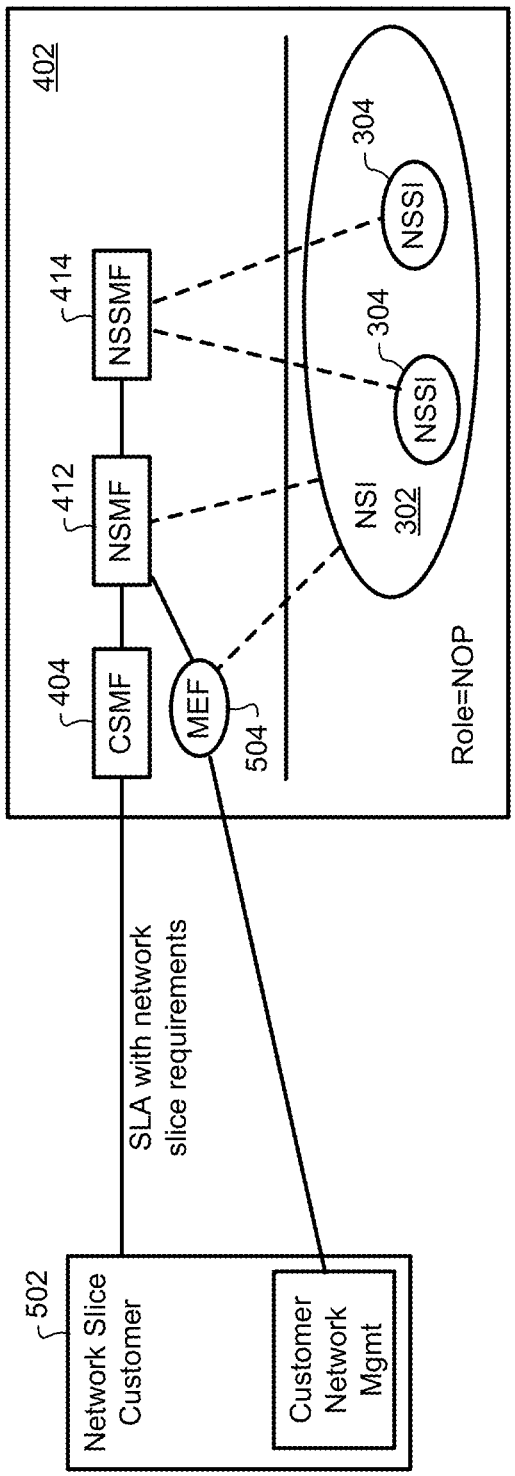
FIG. 5 is a block diagram schematically illustrating an example of NSI as a service.

FIG. 5 shows the involvement of the management functions in providing an NSI 302 as a service. The customer 502 can be provided with limited network management capabilities by exposing certain management functions of the NSMF 412 to the customer 502 through a Management Exposure Function (MEF) 504.

In some embodiments, exposure of management functions may include providing the customer with access to a limited number of management functions. In some embodiments, access to the involved management functions may include providing an API. Alternatively, access may be provided by enabling the customer to subscribe to certain management services provided by the NSMF/MEF.

Figure 7:
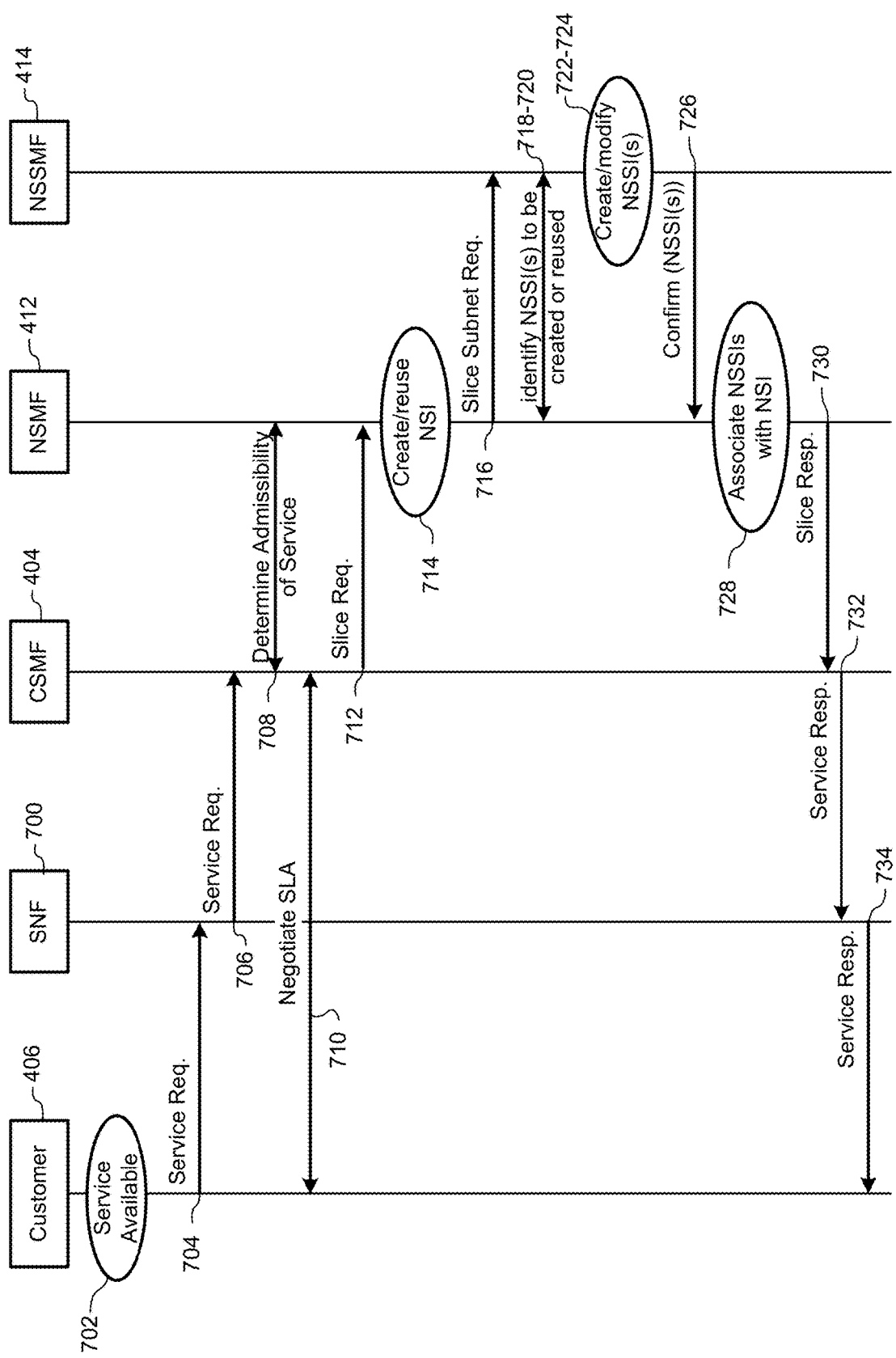
FIG. 7 is a flowchart illustrating an example process in accordance with a first embodiment.

The service request and related service negotiation happens initially between the customer 502 and the CSMF 404. This may be done through a service negotiation function (as shown in FIG. 7) which may be either an internal function of the CSMF or external to the CSMF. However, after the SLA is established, the network provider 402 may provide authorized access to certain NSMF 412 functions so that the customer 502 can use the NSI 302 for its communication services. For example, the customer may use the obtained NSI to provide communication services to its customers using its own CSMF (since customer now has access to certain management functions CSMF can configure the slice to create an SI (as done by CSP in FIG. 4)

How much management capability is exposed is determined by the operator and captured in the SLA since some of the management functionality may be handled by the network provider (in this case operating as a Network Operation Provider (NOP)). For example, Configuration Management (CM) and Fault Management (FM) may be done by the NOP 402, while Performance Management (PM) may be done by the customer 502.

It may be understood that by exposing PM to the customer, the provider can also expose management information such as network information and service information, which may include any one or more of icharging, accounting, policy setup, activation, maintenance and modification actions.

Management Functions Involved in Providing NSSI as a Service

Embodiments of the present invention enable the provision of various types of NSSI as a service. These types may include:
- A Network slice subnetwork (or sub-slice) with a specific logical network topology (such as, for example, NFs and links, and additional NSSIs);
- A Network sub-slice facilitating specific set of traffic flows, each with a given QoS, logical function chains and capability;
- A Network sub-slice consisting of a logical topology pre-defined routes for different types of traffic considering source and destination, with a given capability limit;
- A Network sub-slice as a complete physical topology and resources with pre-defined routes;
- VNF as a service; and
- A Common network slice for control plane traffic.

Figure 6:
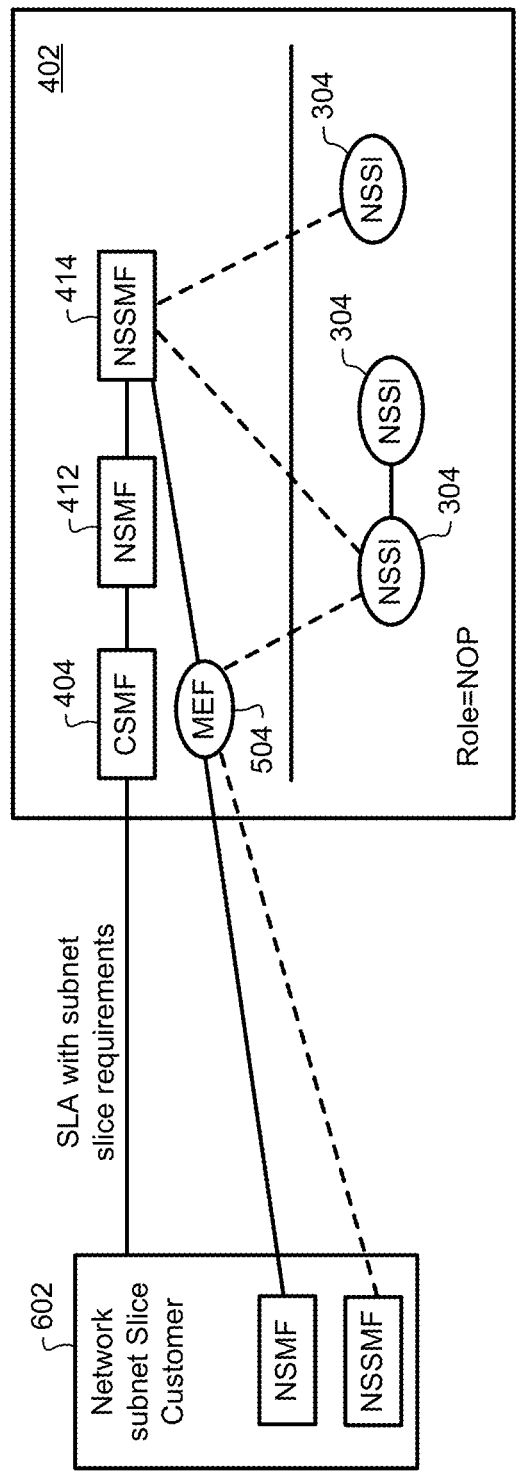
FIG. 6 is a block diagram schematically illustrating an example of NSSI as a service.

FIG. 6 shows the involvement of the management functions for providing an NSSI as a service. As in the example of FIG. 5, the customer 602 can be provided with limited network management capabilities by exposing certain management functions of the NSMF 412 and NSSMF 414 through a Management Exposure Function (MEF) 504.

The service request and related service negotiation may happen initially between the customer 602 and the CSMF 404. However, after the SLA is established, the network provider 402 may provide authorized access to certain NSSMF 414 functions so that the customer 602 can use the NSSI for its communication purposes. It may be appreciated that if the same NSSI is requested by another NSSMF 414, the first NSSMF 414 needs to be involved. This is described in further detail below.

Creating a Network Slice Instance to Provide a Customer Service Request

The solution for creating an NSI, to provide for a customer service request, depends on the type of the service provided to the customer. Four generic customer service types are described below:
- The network operator facilitates communication services of the customer's end user population
- The network operator provides a network slice to the customer so that the customer can use it for its communication services.
- The network operator provides a network slice subnet to the customer so that the customer can use it for its communication services.
- The network operator provides an infra-structure as a service to the customer so that the customer can use it for its communication services.

FIG. 7 is a call flow diagram illustrating an example process for Creating an NSI to provide communication services to customer's end user population. The example process includes the following steps:

Step 702: The Customer 406 determines whether the required service is available with the service provider. In some embodiments, the Customer may check a service catalogue of the Communication Service Provider (CSP) to find whether the required service is available with the service provider.

Step 704: If the service is available, the Customer may specify the service requirements to a Service Negotiation Function (SNF) 700, which may be instantiated either within a 3GPP compliant domain or outside a 3GPP compliant domain. In embodiments in which the SNF 700 is instantiated within a 3GPP compliant domain, the SNF 700 may be incorporated within (or, alternatively, may include) the CSMF 404. In embodiments in which the SNF 700 is instantiated outside a 3GPP compliant domain (for example in the network operator/provider domain), the SNF 700 may interact with the NSMF/412 and NSSMF 414 as needed. The service requirements may include:
- User population or demand requirements for specified durations and geographical regions
- Service requirements for the applications, including data rates and peak rates with KPIs
- Network KPI for aggregate customer requirements
- Charging, authorization and security related requirements
- Whether or not the service needs an exclusive network slice instance.
- Exposure levels required for management and network functions required Step 706: The SNF 700 may determine whether the service requirements agree with at least available service (for example, one of the services in the service catalogue) and, if so, it may send the service request to the Communication Service Management Function (CSMF 404) with overall service related requirements.

Step 708: The CSMF 404 may then determine the admissibility of the customer service with NSMF 412 by providing the NSMF 412 network slice related requirements related to the service requirements. This may include the following steps:
- If the customer service needs to be served exclusively by an NSI, NSMF 412 may determine whether there is sufficient resources to meet the service requirements.
- If CSMF 404 did not specify the exclusive use of an NSI for the service, NSMF 412 may determine whether an existing sharable network slice instance can serve the customer service.
- If both of above options are not applicable, the NSMF 412 may determine whether a new shared slice instance can be created to provide the service.
- Finally, the NSMF 412 may provide different options of facilitating the service and their resource requirements to the CSMF 404.

Step 710: The CSMF 404 may then confirm with the customer all the options available with costs etc., and if an agreeable solution is found, an SLA is created for this customer service.

Step 712: The CSMF 404 may then translate the service related requirements in the SLA into network slice related requirements, and provide them to the NSMF 412. The information indicating whether the requested NSI can be shared with other communication services may be included in the network slice related requirements. The network slice related requirements may also include the authentication related information for the customer's end users.

The information indicating whether the requested NSI can be shared with other communication services may be determined by the CSMF 404 or specified by the SNF 700.

Step 714: If there is information indicating the requested NSI can be shared with other communication services and if an existing available NSI can be used, the NSMF 412 may use the existing NSI. Otherwise, the NSMF 412 may create a new NSI to satisfy the network slice related requirements.

Step 716: The NSMF 412 may then derive the network slice subnet related requirements from the network slice related requirements and send those to the NSSMF(s) 414.

Step 718: If a new NSI is to be created, the NSSMF 414 may identify the NSSI(s) to be reused and the NSSIs to be created.

Step 720: If an existing NSI is to be reused, the NSMF 412 may identify the corresponding NSSIs to be reused.

Step 722: For the NSSI to be created, the NSMF 412 may request corresponding NSSMF 414 to create a new NSSI with the network slice subnet requirements.

Step 724: If an existing NSSI is to be reused, the NSMF 412 may request corresponding NSSMF 414 to modify the NSSI according to the network slice subnet requirements if needed.

Step 726: The NSMF 414 may then confirm the NSSIs to the NSMF 412 as a response to the Slice Subnet Request (step 716).

Step 728: The NSMF 412 may then associate the NSSI(s) with the corresponding NSI.

Step 730: The NSMF 412 may then send a Slice Response message to the CSMF 404 as a response to the Slice Request (step 712).

Step 732: The CSMF 404 may then send a Service Response message to the SNF 700 as a response to the Service Request (step 706).

Step 734: The SNF 700 may then send a Service Response message to the Customer as a response to the Service Request (step 704).

Figure 8:
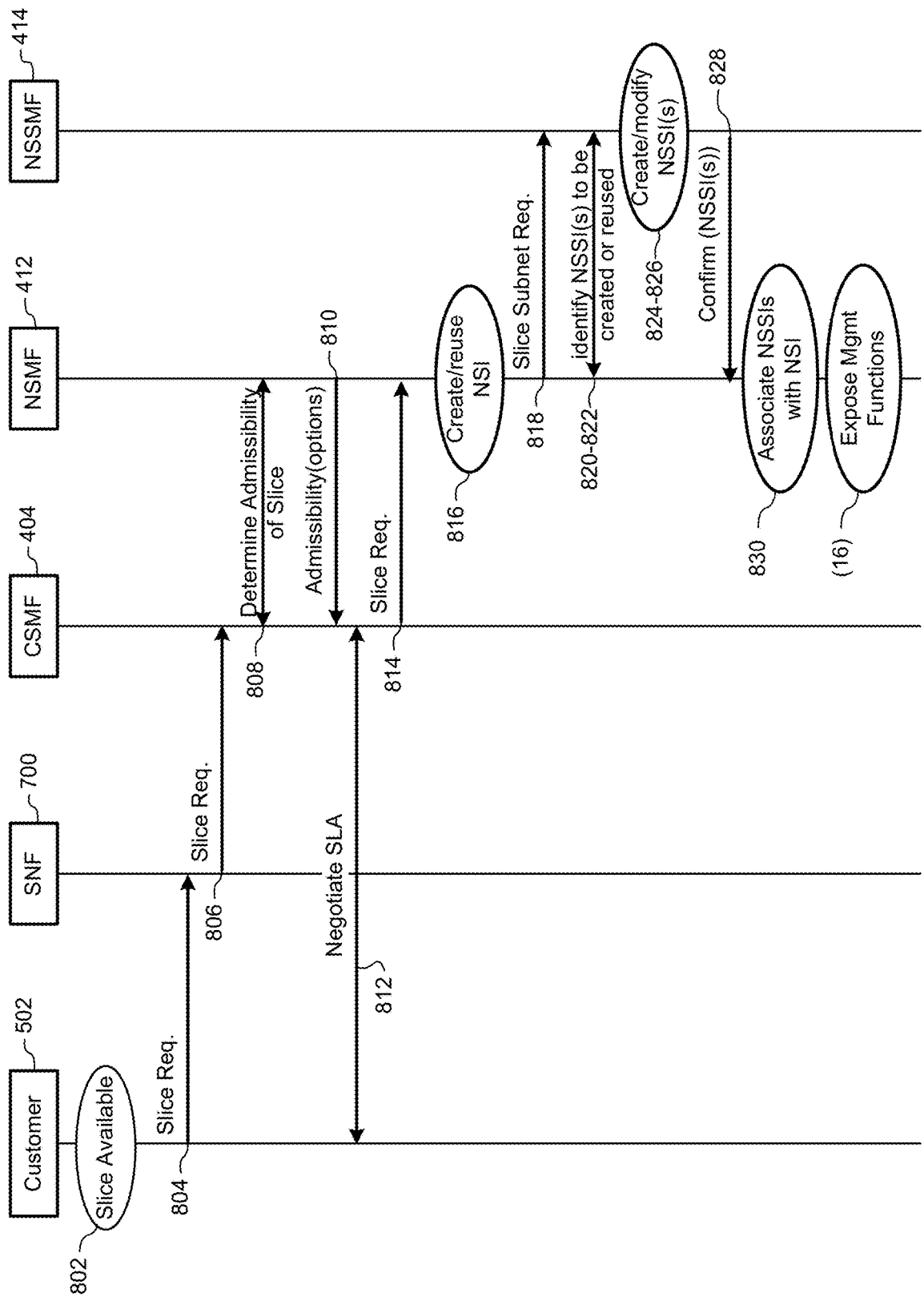

Providing an NSI to a Customer which can be Used by the Customer to Provide Communication Services to its End Users FIG. 8 is a call flow diagram illustrating an example process for providing a network slice to a customer. The example process includes the following steps:

Step 802: The Customer 502 determines whether the required network slice is available with the service provider. In some embodiments, the Customer 502 may check a service catalogue of the network provider that describes the type of network slices the provider can support.

Step 804: If a matching network slice type is found to meet the customer's need, the customer 502 may make a request with specific network slice requirements to the SNF 700. This may include:

- The network function chains, network topology with specific resource requirements and NF related requirements such as placement, and capabilities;
- The service requirements for the slice including network KPIs, e.g., data rates, network outage, peak rates, packet loss rates for the links;
- Charging, authorization and security related requirements;
- If the service needs an exclusive NSI, NSSIs or network functions.
- Exposure levels required for management and network functions required.

Step 806: The SNF 700 may determine whether a matching NSI type is available in its service profile and if so, forward network slice requirements to the service management function (CSMF 404).

Step 808: CSMF 404 may determine the admissibility of the network slice from the NSMF 412. This may include identifying:

- Whether there is sufficient resources to meet the requirements of the network slice.
- Alternative network slice instances that can be offered to the customer and associated resource costs.

Step 810: The NSMF 412 may provide to the CSMF 404 the admissibility including different options of providing a service and their resource requirements Step 812: CSMF 404 may analyze the options and negotiate a possible solution with the customer and, if agrees to a certain set of requirements, set up an SLA.

Step 814: CSMF 404 may prepare the network slice requirements according to SLA and provides them to the NSMF 412.

Step 816: NSMF 412 may create a new NSI or use an existing sharable NSI for the service as per the SLA.

Step 818: The NSMF 412 may then derive the network slice subnet related requirements from the network slice related requirements and send those to the NSSMF 414(s).

Step 820: If a new NSI is to be created, the NSSMF 414 may identify the NSSI(s) to be reused and the NSSIs to be created.

Step 822: If an existing NSI is to be reused, the NSMF 412 may identify the corresponding NSSIs to be reused.

Step 824: For the NSSI to be created, the NSMF 412 may request corresponding NSSMF 414 to create a new NSSI with the network slice subnet requirements.

Step 826: If an existing NSSI is to be reused, the NSMF 412 may request corresponding NSSMF 414 to modify the NSSI according to the network slice subnet requirements if needed.

Step 828: The NSMF 414 may then confirm the NSSIs to the NSMF 412 as a response to the Slice Subnet Request (step 818).

Step 830: NSMF 412 may associate NSSIs with the corresponding NSI.

Step 832: If the management of a NSI or NSSI is needed to be exposed to the customer, the NSMF 412 may separate certain management functionalities in NSMF 412 or NSSMF 414 as a set of exposed slice specific management functions, and provide access to these exposed functions to the customer.

As noted above, in some embodiments, the SNF 700 may be incorporated within (or, alternatively, may include) the CSMF 404. In such cases, the functional separation between the SNF 700 and CSMF 404 shown in FIG. 8 disappears, and the SNF 700 may interact directly with the NSMF 412.

Figure 9:
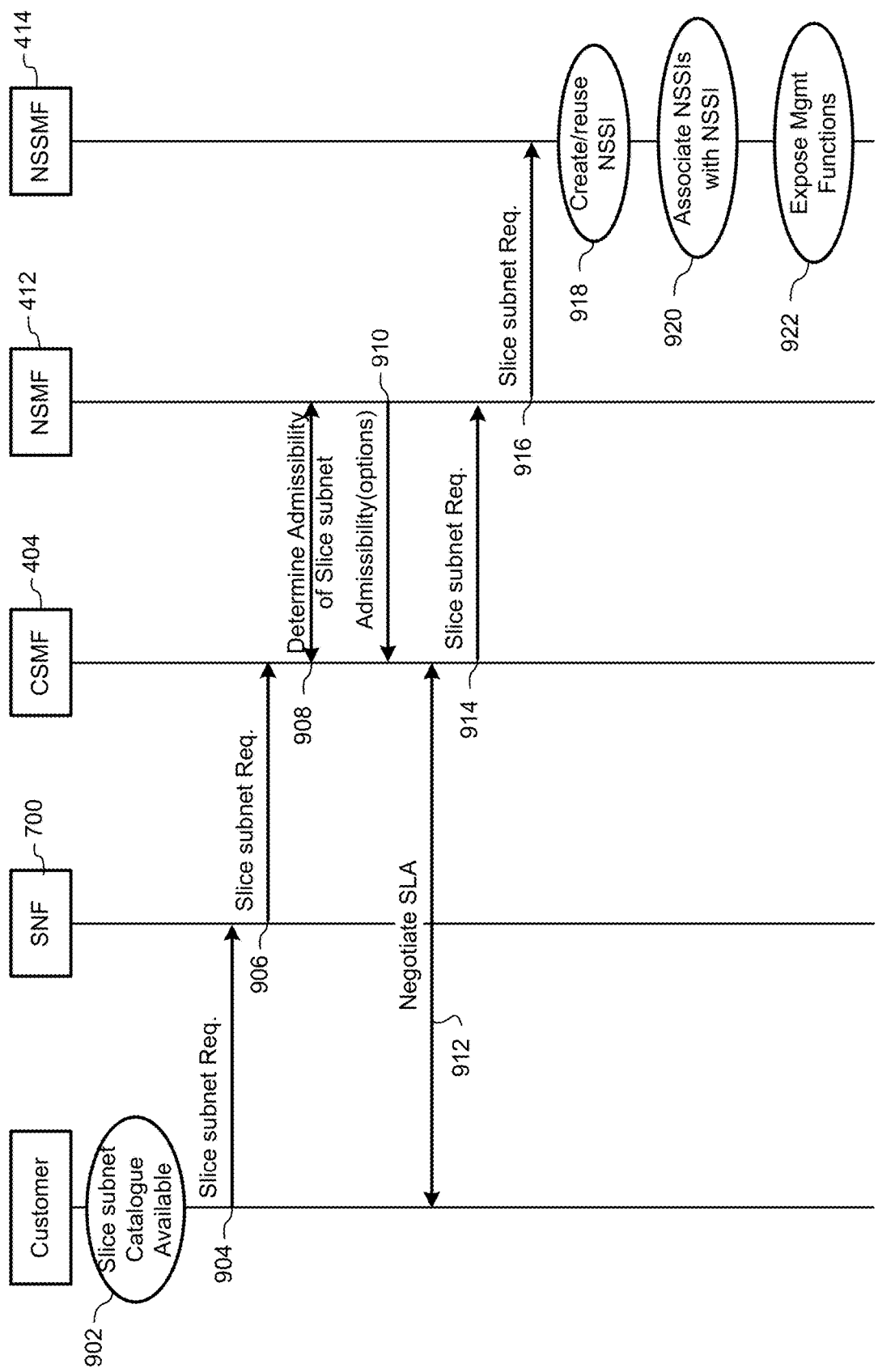
FIG. 9 is a flowchart illustrating an example process in accordance with a third embodiment.

Providing an NSSI to a Customer which can be used by the Customer to Form a NSI or NSSI FIG. 9 is a call flow diagram illustrating an example process for providing a network slice subnet to a customer. The example process includes the following steps:

Step 902: The Customer determines whether the required network slice subnet is available with the service provider. In some embodiments, the Customer may check the service catalogue of the network provider that describes the type of network slice subnets the provider can support.

Step 904: If a matching slice subnet type is found to meet the customer's need, the customer may make a request with specific slice subnet requirements to the SNF 700. This may include:

- The network function chains, network topology with specific resource requirements and NF related requirements such as placement, and capabilities;
- The service requirements for the slice including network KPIs, e.g., data rates, network outage, peak rates, packet loss rates for the links;
- Charging, authorization and security related requirements;
- If the service needs an exclusive NSSIs or network functions.
- Exposure levels required for management and network functions required.

Step 906: The SNF 700 may determine whether a matching NSSI type is available in its service profile and if so, forward network slice subnet requirements to the communications service management function (CSMF 404).

Step 908: CSMF 404 may check the admissibility of the network slice subnet from the NSMF 412. This may include the following steps:
  NSMF 412 checks the admissibility of the network slice subnet from the NSSMF 414.
  NSSMF 414 checks whether there is sufficient resources to meet the requirements of the network slice subnet including the resources for the network functions.
  NSSMF 414 finds alternative network slice subnet solutions that can be offered to the customer and associated resource costs.
  NSSMF 414 informs the outcome to the NSMF 412.

Step 910: The NSMF 412 may provide the CSMF 404 the admissibility information including different options of providing a service and their resource requirements.

Step 912: CSMF 404 may analyze the options and negotiate a possible solution with the customer and, if it agrees to a certain set of requirements, it sets up an SLA.

Step 914: CSMF 404 may prepare the network slice subnet requirements according to SLA and provide them to the NSMF 412.

Step 916: NSMF 412 may prepare the network slice subnet requirements and provide them to the NSSMF 414.

Step 918: NSSMF 414 may create a new NSSI or use an existing sharable NSSI for the service as per the SLA. This may include the following steps:
  Inform the EM about network function requirements.
  NSSMF 414 creates new NSSIs or modifies the existing NSSIs for the service according to the requirements including network functions requirements Step 920: NSSMF 414 may associate network functions and NSSIs with the corresponding NSSI.

Step 922: If the management of a NSSI is needed to be exposed to the customer, the NSSMF 414 separates certain management functionalities in NSSMF 414 according to the SLA as a set of exposed slice specific management functions and access is provided to the customer.

As noted above, in some embodiments, the SNF 700 may be incorporated within (or, alternatively, may include) the CSMF 404. In such cases, the functional separation between the SNF 700 and CSMF 404 shown in FIG. 9 disappears, and the SNF 700 may interact directly with the NSMF 412 and/or the NSSMF 414.

A focus of this disclosure is the message flows and CSMF 404, NSMF 412, NSSMF 414 functionality. We can consider NSMF 412 (or its NSIs) as serving CSMF 404 (or SI) and NSSMF 414 (Or its NSSIs) as serving NSMF 412 and Element Management (EM) entities (managing NFs, for example) serving NSSMF 414. The function includes two main functions: (1) The functionality in the admission control phase; (2) Functionality in the service provision (slice creation phase).

Functionality During Service Establishment Phase (After SLA)

CSMF 404 obtains the SLA requirements and converts them to network slice related requirements. However, to do this, NSMF 412 should preferably have informed the CSMF 404 of the type of services (NSIs) it can provide. In some embodiments, this is accomplished by providing the NSMF 412 with its own NSI catalogue. The CSMF 404 may pick one of the matching NSI type/templates and include the required specifications and send it to the NSMF 412.

NSMF 412 receives the Network slice related information with the request from the CSMF 404 and converts it to NSSMF 414 related requirements and NF related requirements. For this purpose, the NSSMF 414 should notify its service catalogue to the NSMFs it is serving or may serve.

The NSMF 412 may pick one of the NSSMF types/templates from the catalogue and include its specifications and send the NSSI request to the NSSMF 414.

NSSMF 414 receives the NSSI requirements and converts them to NF requirements including NF location, salability, resource requirement etc. and instantiate and configure NFs.

Functionality During Admission Control Phase (Prior to SLA)

In the admission control stage all three of the above functions have a corresponding role, but bit different. This may be better understood from the following example.

When a CSMF 404 receives the customer service request, it may check the admissibility in two ways:

A first method is to check the NSMF 412 service profile, and the NSMF 412 may have updated its resource availability for this type of service. By analysing the resource availability, the NSMF 412 it can determine whether it can provide the particular type of service with the specified demand level. It can also identify counter offers it can give to the customer knowing what type of services or what demand it can provide.

In a second method, the NSMF 412 may not show the available resources to the CSMF 404 for different service types (for example, it may or may not provide the service catalogue). In this case, the CSMF 404 may query the NSMF 412 whether the particular service with such network slice requirements can be admitted or not. Then, the NSMF 412 may indicate whether it can admit the service, or if not, what alternative offers it can provide.

As may be appreciated, the association between CSMFs and NSMFs is recursive. Accordingly, an NSMF 412 may determine admissibility of a service by interacting with an NSSMF 414 in a manner directly analogous to that described above for the CSMF 404. Thus, the NSMF 412 may check a NSSMF service profile, which has been updated by the NSSMF 414 to determine whether it can provide the particular type of service with the specified demand level. Alternatively, the NSMF 412 may query the NSSMF 414 whether the particular service with such network slice requirements can be admitted or not. This process of determining admissibility of a service can be repeated as needed for each layer in a hierarchical structure of CSMF-NSMF-NSSMF-NSSMF . . .

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by modules or functional elements specific to those steps. The respective units/modules may be implemented as specialized hardware, software executed on a hardware platform that is comprised of general purpose hardware, or a combination thereof. For instance, one or more of the units/modules may be implemented as an integrated circuit, such as field programmable gate arrays (FPGAs) or application-specific integrated circuits (ASICs). It will be appreciated that where the modules are software, they may be stored in a memory and retrieved by a processor, in whole or part as needed, individually or together for processing, in single or multiple instances as required. The modules themselves may include instructions for further deployment and instantiation.

Based on the foregoing, it may be appreciated that embodiments of the present invention provide:

A system for managing a network comprising a network slice instance, the network slice instance including a network slice subnet instance, the system comprising:
a network slice management function associated with the network slice instance, the network slice management function configured to expose one or more management functions to a customer such that the customer can effect limited management of its associated network slice instance; and
a network slice subnet management function associated with the network slice subnet instance, the network slice management function configured to expose one or more management functions to a customer such that the customer can effect limited management of its associated network slice subnet instance Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A communication service provider (CSP) system comprising:
a service negotiation function configured to interact with a customer of the CSP to negotiate a service level agreement for providing a network slice instance as a service;
a network slice subnet management function associated with a network slice subnet instance, the network slice subnet management function configured to implement and manage operation of the network slice subnet instance;
a network slice management function configured to implement, based on network resource requirements included in the service level agreement, the network slice instance that includes the network slice subnet instance, the network slice management function configured to manage operation of the network slice instance, and interact with the network slice subnet management function to manage operation of the network slice subnet instance; and
a management exposure function operatively connected to the network slice management function, the management exposure function configured to expose one or more management functionalities in the network slice management function to the customer in accordance with the service level agreement which specifies one or more management functionalities in the network slice management function to be exposed to the customer to provide the customer access to the one or more management functionalities in the network slice management function to manage operation of the network slice instance, said managing operation including using the exposed management functionalities to obtain data,
wherein one of the management functionalities in the network slice management function is for performance measurement, and
wherein the management exposure function is configured to expose the network slice management function to a management function of the customer by any one or more of:
providing an Application Programming Interface (API) to the customer, the API configured to enable the customer to interact with the network slice management function to manage operation of the network slice instance;
enabling the customer to subscribe to a management service provided by the network slice management function.

2. The CSP system as claimed in claim 1, wherein the network slice instance comprises network resources of a first network operator, and the network slice subnet instance comprises network resources of a second network operator different than the first network operator.

3. The CSP system as claimed in claim 1, wherein the network slice instance comprises network resources of a first network domain, and the network slice subnet instance comprises network resources of a second network domain different than the first network domain.

4. The CSP system as claimed in claim 1, further comprising a communication service management function configured to interact with the network slice management function to allocate resources to the network slice instance in accordance with the service level agreement.

5. The CSP system as claimed in claim 4, wherein the network slice management function is further configured to interact with the network slice subnet management function to allocate resources to the network slice subnet instance in accordance with the service level agreement.

6. The CSP system of claim 1, wherein the management exposure function is further configured, to expose the one or more management functionalities in the network slice subnet management function to provide the customer access to the one or more management functionalities in the network slice subnet management function to manage operation of the of the network slice subnet instance.

7. The CSP system of claim 1, wherein the service negotiation function is included in a Communication Service Management Function.

8. The CSP system of claim 6, wherein the management exposure function is configured to expose the one or more network functionalities in the network slice subnet management function to the customer by any one or more of:
providing an Application Programming Interface (API) to the customer, the API configured to enable the customer to interact with the network slice subnet management function to manage operation of the network slice subnet instance;
enabling the customer to subscribe to a management service provided by the network slice subnet management function.

9. A method comprising:
receiving, by a Communication Service Management Function (CSMF) of a Communication Service Provider, a service request for providing a network slice instance as a service, the service request including network slice requirements;
negotiating, by interaction between the customer and the CSMF, a Service Level Agreement (SLA) for providing the network slice instance as a service, the SLA including network resource requirements for the network slice instance negotiated based on the network slice requirements, the SLA specifying one or more management functionalities of a Network Slice Management Function (NSMF) to be exposed to the customer;
sending, by the CSMF to the NSMF, network resource requirements included in the SLA and an indication of the one or more management functionalities of the NSMF specified in the SLA that are to be exposed to the customer; and receiving, by the CSMF, a response from the NSMF, the response indicating that the NSMF implemented a network slice instance in accordance with the network resource requirements and exposed the one or more management functionalities in the NSMF to the customer to provide the customer access to one or more management functionalities in the NSMF to manage operation of the network slice instance, said managing operation including using the exposed management functionalities to obtain data, wherein one of the management functionalities in the NSMF is for performance measurement, and wherein the NSMF is exposed, via a management exposure function, to a management function of the customer by any one or more of:

providing an Application Programming Interface (API) to the customer, the API configured to enable the customer to interact with the NSMF to manage operation of the network slice instance;

enabling the customer to subscribe to a management service provided by the NSMF.

10. The method of claim 9, wherein negotiating the SLA comprises receiving, by the CSMF, any one or more of:
user population or demand requirements;
service requirements for one or more applications;
network KPI for aggregate customer requirements;
charging, authorization and security related requirements;
whether or not the service needs an exclusive network slice instance; and
exposure levels required.

11. The method of claim 9, wherein negotiating the SLA comprises:
requesting, by the CSMF, a feasibility of providing network resources to satisfy the network slice requirements from the NSMF; and
receiving, by the CSMF, an indication from the NSMF of the feasibility of providing the network slice requirements.

12. The method of claim 11, wherein requesting, by the CSMF, a feasibility of providing the network slice requirements comprises sending, to the NSMF, any one or more of:
network function chains;
network topology with specific resource requirements;
network function related requirements;
service requirements for the slice;
charging, authorization and security related requirements;
whether or not the service needs an exclusive network slice instance (NSI), network slice subnet instances (NSSIs) or network functions; and
exposure levels required.

13. A processing unit comprising:
a processor;
a non-transitory memory storing instructions which when executed by the processor cause the processor to provide a Communication Service Management Function (CSMF) configured to:
receive a service request for providing a network slice instance as a service, the service request including network slice requirements;
negotiate with a customer, a Service Level Agreement (SLA) for providing the network slice instance as a service, the SLA including network resource requirements for the network slice instance negotiated based on the network slice requirement, the SLA specifying one or more management functionalities of a Network Slice Management Function (NSMF) to be exposed to the customer;
send network resource requirements included in the SLA and an indication of the one or more management functionalities of the NSMF specified in the SLA that are to be exposed to the customer to the NSMF; and
receive a response from the NSMF, the response indicating that the NSMF implemented a network slice instance in accordance with the network resource requirements and exposed the one or more management functionalities in the NSMF to the customer to provide the customer access to the one or more management functionalities in the NSMF to manage operation of the network slice instance, said managing operation including using the exposed management functionalities to obtain data,
wherein one of the management functionalities in the NSMF is for performance measurement, and
wherein the NSMF is exposed, via a management exposure function, to a management function of the customer by any one or more of:
providing an Application Programming Interface (API) to the customer, the API configured to enable the customer to interact with the NSMF to manage operation of the network slice instance;
enabling the customer to subscribe to a management service provided by the NSMF.

14. The method of claim 9 further comprising:
prior to receiving the service request, sending, by the CSMF a service catalogue to the customer.

15. The processing unit of claim 13, wherein the CSMF is further configured to, prior to receiving the service request, sending, by the CSMF a service catalogue to the customer.

* * * * *

UNITED STATES PATENT AND TRADEMARK OFFICE
CERTIFICATE OF CORRECTION

Page 1 of 1

PATENT NO. : 11,050,626 B2
APPLICATION NO. : 15/958237
DATED : June 29, 2021
INVENTOR(S) : Nimal Gamini Senarath It is certified that error appears in the above-identified patent and that said Letters Patent is hereby corrected as shown below:

In the Specification

In the Description

Column 4, Line 28, "FIG. 7 is a flowchart illustrating an example process in" should be --FIG. 8 is a flowchart illustrating an example process in--

Column 6, Line 40, "information. For example, the information provided by MS" should be --information. For example, the information provided by NIS--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*